United States Patent
Hisamatsu

(10) Patent No.: US 8,979,219 B2
(45) Date of Patent: Mar. 17, 2015

(54) ROLLER UNIT

(75) Inventor: Kenichi Hisamatsu, Hirakata (JP)

(73) Assignee: Komatsu Ltd., Tokyo (JP)

( * ) Notice: Subject to any disclaimer, the term of this patent is extended or adjusted under 35 U.S.C. 154(b) by 451 days.

(21) Appl. No.: 13/391,787

(22) PCT Filed: Mar. 30, 2011

(86) PCT No.: PCT/JP2011/058066
§ 371 (c)(1),
(2), (4) Date: Feb. 22, 2012

(87) PCT Pub. No.: WO2011/125761
PCT Pub. Date: Oct. 13, 2011

(65) Prior Publication Data
US 2012/0146397 A1     Jun. 14, 2012

(30) Foreign Application Priority Data

Apr. 7, 2010   (JP) .................................. 2010-088544

(51) Int. Cl.
| B62D 55/15 | (2006.01) |
| B62D 55/14 | (2006.01) |
| F16J 15/32 | (2006.01) |

(52) U.S. Cl.
CPC ............... *B62D 55/14* (2013.01); *B62D 55/15* (2013.01); *F16J 15/3256* (2013.01)
USPC .......................................... 305/136; 305/100

(58) Field of Classification Search
CPC ................. B62D 55/14; B62D 55/15
USPC .................. 305/100, 124, 129, 136, 138, 142
See application file for complete search history.

(56) References Cited

U.S. PATENT DOCUMENTS

| 4,149,758 A | * | 4/1979 | Livesay | ........................ | 305/118 |
| 6,074,023 A | * | 6/2000 | Satou et al. | ................... | 305/116 |

(Continued)

FOREIGN PATENT DOCUMENTS

| DE | 29 36 798 A1 | 4/1981 |
| JP | 63-43991 U | 3/1988 |

(Continued)

OTHER PUBLICATIONS

International Search Report dated Jun. 7, 2011 issued in International Appln. No. PCP/JP2011/058066.

(Continued)

*Primary Examiner* — Kip T Kotter
*Assistant Examiner* — Jean Charleston
(74) *Attorney, Agent, or Firm* — Holtz, Holtz, Goodman & Chick PC

(57) ABSTRACT

A roller unit is provided which includes: (i) a roller configured to roll in contact with a crawler belt; (ii) a roller shaft for rotatably supporting the roller; (iii) a seal fit in an annular space defined between the roller and the roller shaft, wherein the seal is formed such that an inner circumference side sealing portion located on an inner circumference side and an outer circumference side sealing portion located on an outer circumference side and press-fit in the roller are fit together so as to come into slidable contact with each other; and (iv) a collar mounted to the roller shaft, wherein the collar has a boss portion onto which the inner circumference side sealing portion is pressed and a flange portion disposed on an atmosphere side of the inner circumference side sealing portion.

A gap is formed between an end face of the outer circumference side sealing portion and the flange portion and the flange portion is provided with a circumferentially extending groove formed on a side opposed to the outer circumference side sealing portion. The outer circumference side sealing portion is disposed so as to enclose the inner circumference side sealing portion, and the flange portion is brought into contact with an end face of the inner circumference side sealing portion located on the atmosphere side of the inner circumference side sealing portion.

4 Claims, 7 Drawing Sheets

(56) References Cited

U.S. PATENT DOCUMENTS

| | | | |
|---|---|---|---|
| 7,237,853 B2 * | 7/2007 | Yamamoto et al. | 305/136 |
| 8,366,212 B2 * | 2/2013 | Maeda et al. | 305/136 |

FOREIGN PATENT DOCUMENTS

| | | |
|---|---|---|
| JP | 1-106380 U | 7/1989 |
| JP | 10-086863 A | 4/1998 |
| JP | 2002-098234 A | 4/2002 |
| JP | 2004-149111 A | 5/2004 |
| JP | 3808300 B2 | 5/2006 |
| JP | 2010-052596 A | 3/2010 |

OTHER PUBLICATIONS

International Preliminary Report on Patentability (IPRP) and Written Opinion dated Nov. 6, 2012 (in English) issued in parent International Application No. PCT/JP2011/058066.

German Office Action dated Dec. 10, 2012 (and English translation thereof) in counterpart German Application No. 11 2011 101 190.3.

Korean Office Action dated Dec. 10, 2012 issued in counterpart Korean Application No. 10-2012-7007934.

* cited by examiner

1(a)

1(b)

ROLLER UNIT

TECHNICAL FIELD

The invention relates to a roller unit that is well suited for use in the crawler track units of a work vehicle such as hydraulic excavators.

BACKGROUND ART

The shaft seal such as disclosed, for example, in Patent Literature 1 has been known as a member for hermetically sealing the gap between two members which are coaxially rotatable relative to each other. This shaft seal is comprised of an inner circumference side sealing portion located on the inner circumference side and an outer circumference side sealing portion located on the outer circumference side, these sealing portions being fit to each other such that they can come into slidable contact.

Incidentally, if earth, sand or the like penetrates into the seal slidable contact parts of the inner and outer circumference side sealing portions, wear of the seal is accelerated, extremely shortening the service life of the seal. It is therefore important to provide a means for preventing penetration of earth, sand or the like into the seal slidable contact parts in order to extend the service life of the seal. The shaft seal disclosed in Patent Literature 1 is designed to prevent penetration of earth, sand, etc. into the seal sliding parts by providing a covering member so as to stride over the inner and outer circumference side sealing portions so that early wear of the seal can be avoided.

Crawler track units are widely used as an undercarriage in work vehicles such as hydraulic excavators. Such crawler track units often include roller units in which a floating seal is assembled into an annular space defined between a roller configured to roll in contact with the crawler belt and a roller shaft for rotatably supporting this roller (see e.g., Patent Literature 2).

CITATION LIST

Patent Literature

Patent Literature 1: Japanese Patent No. 3808300
Patent Literature 2: JP-A-2004-149111

If the floating seal provided in the above roller units is replaced by a shaft seal, the following problem will be arisen.

Specifically, it becomes necessary to uniformly apply a push-in force to the outer end face of the seal in order to properly fit the shaft seal in the annular space between the roller and the roller shaft without giving damage thereto. The uniform application of the push-in force to the outer end face of the seal requires special tools and the like, which spoils the ease of assemblability.

SUMMARY OF INVENTION

Technical Problem

The invention is directed to overcoming the foregoing problem and a primary object of the invention is therefore to provide a roller unit that is improved in the service life of the seal as well as in the ease of unit assemblability.

Solution to Problem

The above object can be accomplished by the roller unit of the invention having a roller configured to roll in contact with a crawler belt, a roller shaft for rotatably supporting the roller, and a seal fit in an annular space defined between the roller and the roller shaft, wherein the seal is formed such that an inner circumference side sealing portion located on an inner circumference side and an outer circumference side sealing portion located on an outer circumference side and press-fit in the roller are fit together so as to come into slidable contact with each other;

which further comprises a collar mounted to the roller shaft;

wherein the collar has a boss portion into which the inner circumference side sealing portion is pressed and a flange portion in contact with an outer end face of the inner circumference side sealing portion; and wherein a gap is formed between an end face of the outer circumference side sealing portion and the flange portion and the flange portion is provided with a circumferentially extending groove formed on a side opposed to the outer circumference side sealing portion (First Invention).

Preferably, in the present invention, the collar has a mounting portion integrally formed therewith, the mounting portion being secured to a track frame that serves as a mating part when the roller unit is mounted (Second Invention).

Preferably, in the present invention, a thrust load from the roller is received by an end face of the boss portion (Third Invention).

Advantageous Effects of Invention

In the invention, the flange portion of the collar is in contact with the outer end face of the seal. With this arrangement, the flange portion of the collar prevents penetration of earth, sand, etc. into the seal slidable contact parts of the inner and outer circumference side sealing portions. Accordingly, the wear of the seal attributable to the penetration of earth, sand, etc. into the seal slidable contact parts can be restricted and, in consequence, the service life of the seal can be extended.

When fitting the seal in the annular space defined between the roller and roller shaft, only the end face of the inner circumference side sealing portion of the seal is pressed by the flange portion of the collar. Thanks to this, no load is imposed on the outer circumference side sealing portion so that the outer and inner circumference side sealing portions can be kept in a proper positional relationship. In consequence, the area extending between the outer and inner circumference side sealing portions can be properly sealed.

Further, the provision of the mounting portion in the collar that is secured to the track frame leads to an improvement in the ease of unit assemblability.

In addition, since the boss portion receives a thrust load from the roller, the structure of the roller unit can be simplified so that the seal can be smoothly fit in the annular space between the roller and the roller shaft without use of special tools, which results in an improvement in the ease of unit assemblability.

In addition, it is possible to avoid such an undesirable situation that the rotating side of the outer end face of the seal hits against the flange portion of the collar in the course of assembly, causing deformation of and damage to the seal. It is apparent that the same effect can be expected during traveling.

BRIEF DESCRIPTION OF DRAWINGS

FIG. 1(a) is a side view of a crawler track unit having track roller units constructed according to one embodiment of the invention, whereas FIG. 1(b) is an enlarged view of an X part shown in FIG. 1(a).

BEST MODE FOR CARRYING OUT INVENTION

Referring now to the accompanying drawings, a roller unit will be described according to a preferred embodiment of the invention. Although the following embodiment has been described in the context of a case where the invention is applied to roller units (track roller units) provided in a crawler track unit of a hydraulic excavator, the invention is not limited to this case but is equally applicable to roller units (track roller units) provided in a crawler track unit of other work vehicles such as bulldozers.

(Outline of Crawler Track Unit of Hydraulic Excavator)

Figure 1:
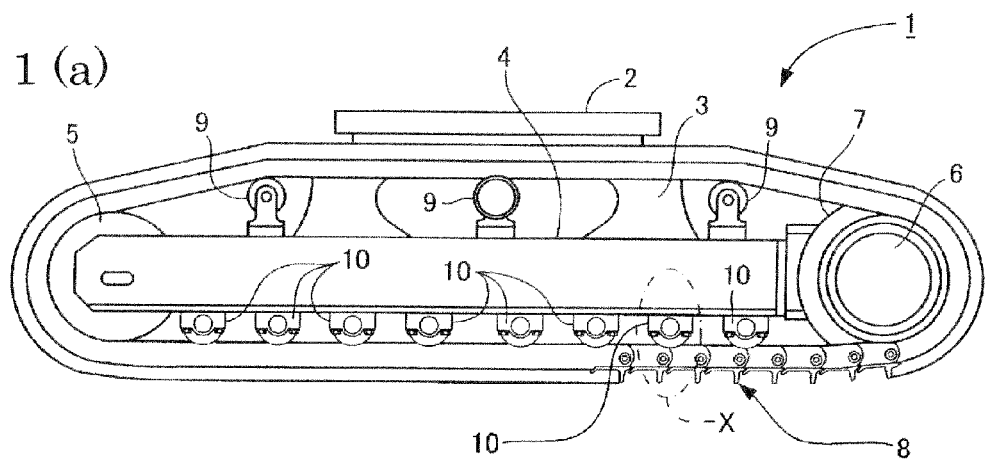
Figure 1:
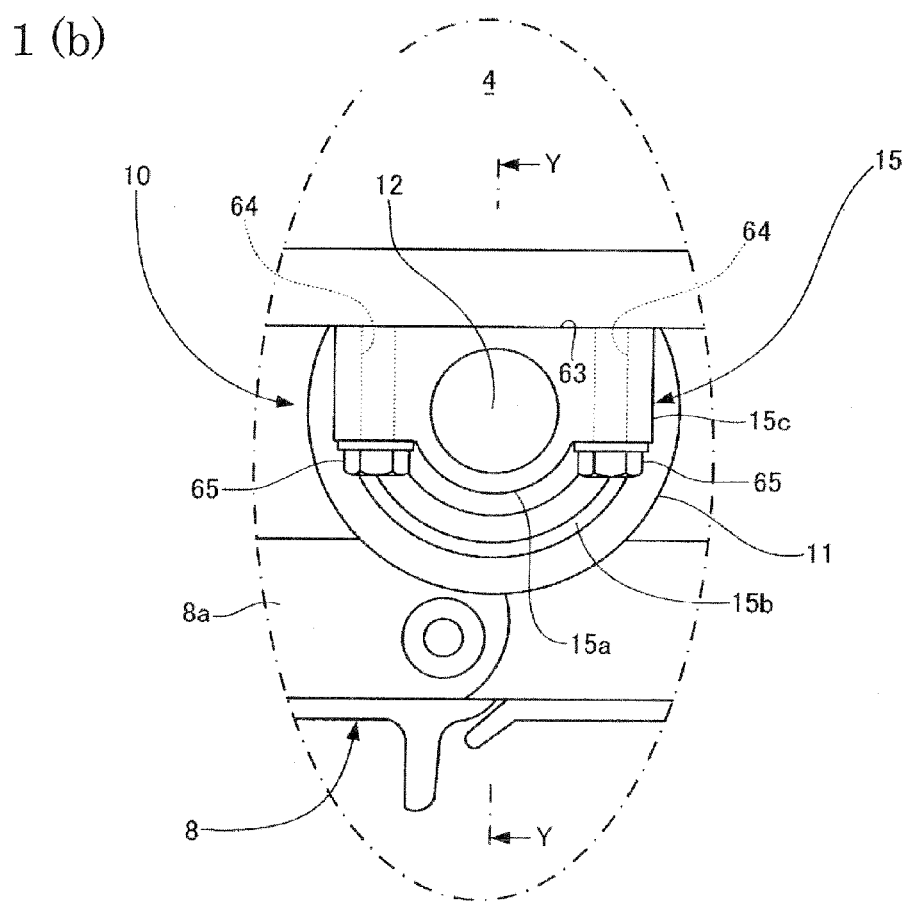

FIG. 1 shows a crawler track unit 1 which includes track frames 4 that extend in a longitudinal direction on the sides, respectively, of a center frame 3 (only the track frame located on the left side is shown). The center frame 3 has a mounting table 2 for a swing bearing (not shown) that is configured to rotatively support an upper machinery (not shown). In each track frame 4, an idler (idler tumbler) 5 is rotatably attached to its front end whereas a sprocket (driving wheel) 7 rotatively driven by a hydraulic travel motor 6 is attached to its rear end. Wounded around between the idler 5 and the sprocket 7 is a crawler belt 8. The rotation of the sprocket 7 driven by the hydraulic travel motor 6 causes the go-around movement of the crawler belt 8.

(Location of Track Roller Units and Track Carrier Roller Units)

Disposed on the upper surface of the track frame 4 are a desired number (three in this embodiment) of track carrier roller units 9 configured to support the crawler belt 8 from its underside so as to prevent hang-down of the crawler belt 8 due to its own weight. The track carrier roller units 9 are spaced at specified intervals in a longitudinal direction of the track frame 4.

Disposed on the lower surface of the track frame 4 are a desired number (eight in this embodiment) of track roller units 10 configured to dispersedly transmit the weight of the vehicle body to the crawler belt 8, the track roller units 10 being spaced at specified intervals in the longitudinal direction of the track frame 4.

Next, a structure of the track roller units 10 will be described in details below with reference to FIGS. 2 and 3.

(Outline of Structure of Track Roller Unit)

Figure 2:
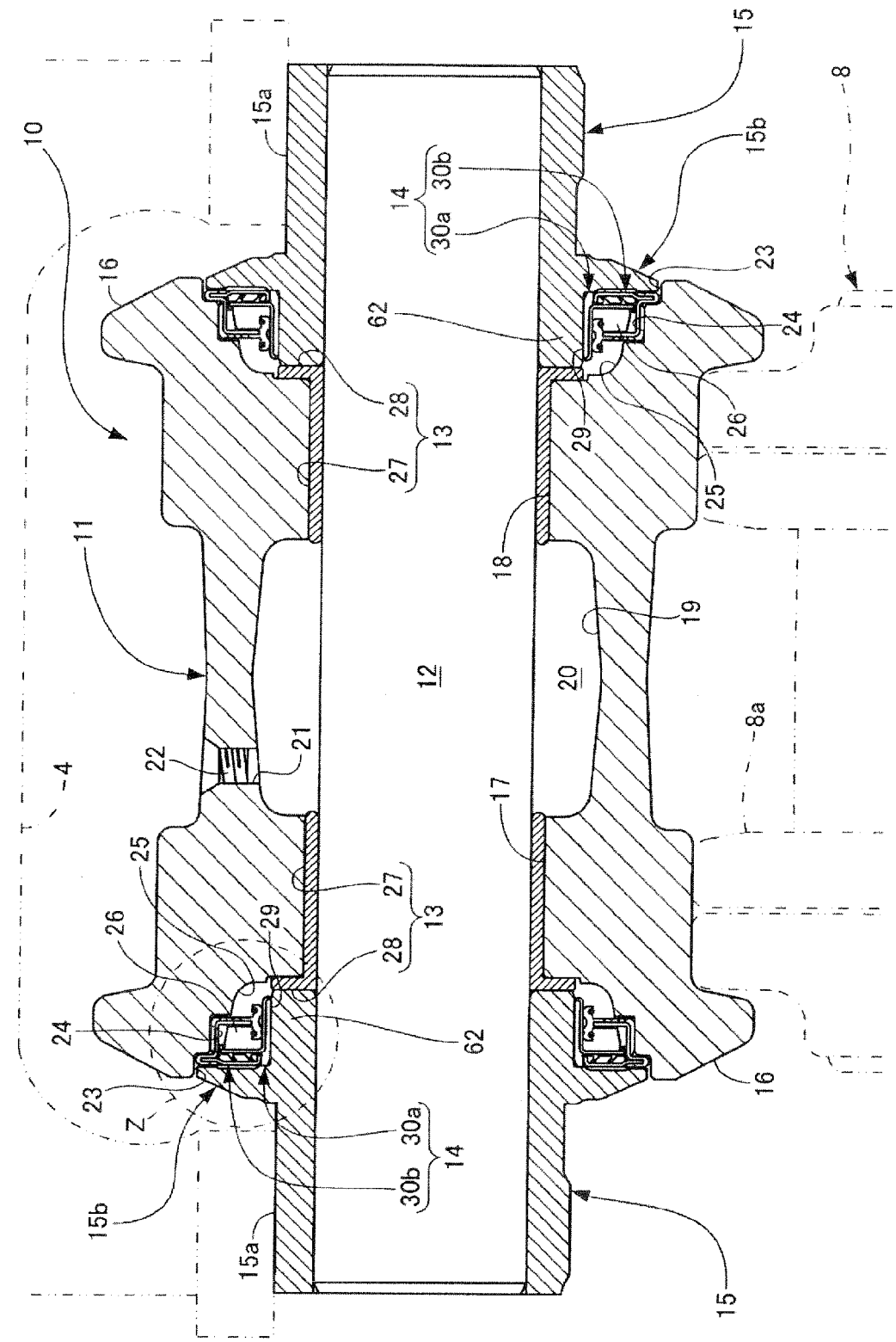
FIG. 2 is a sectional view of a substantial part taken along line Y-Y of FIG. 1(b).

As illustrated in FIG. 2, each track roller unit 10 has a roller 11, a roller shaft 12, bushings 13, seals 14 and collars 15.

(Description of Roller)

The roller 11 rotates on the crawler belt 8 in conjunction with the go-around movement of the crawler belt 8.

Provided at each end of the roller 11 is a flange portion 16 that protrudes outwardly in a radial direction. The flange portions 16 retain a track link portion 8a of the crawler belt 8 at both sides thereof so that not only the roller 11 can stably roll on the crawler belt 8 but also the crawler belt 8 can be prevented from meandering.

The shaft center of the roller 11 is provided with a first shaft hole 17 opened at one end thereof (the left side in FIG. 2) and a second shaft hole 18 opened at another end thereof (the right side in FIG. 2). Both of the first shaft hole 17 and the second shaft hole 18 are for allowing insertion of the roller shaft 12. The inner circumferential surface of the roller 11 located between the first shaft hole 17 and the second shaft hole 18 is provided with a recess 19. The space defined between the recess 19 and the roller shaft 12 is an oil reservoir 20 for storing lubricant oil.

The central circumferential wall of the roller 11 is provided with an oil feeding screw hole 21 that is pierced to allow communication between the oil reservoir 20 and the outside of the oil reservoir 20. A plug screw 22 is threaded into this oil feeding screw hole 21 such that the lubricant oil stored in the oil reservoir 20 cannot go out through the oil feeding screw hole 21.

Formed at each end of the roller 11 are a first stepped portion 23, a second stepped portion 24 and a third stepped portion 25 and the stepped portion closer to the center of the roller 11 has smaller inner diameter. Formed between these stepped portions 23, 24, 25 and the roller shaft 12 is an annular space 26.

(Description of Roller Shaft)

The roller shaft 12 is a support shaft for rotatively supporting the roller 11 and the ends of the roller shaft 12 project from the end faces, respectively, of the roller 11 by a specified length including allowance for mounting the collar 15.

(Description of Bushing)

The bushings 13 are inserted into the first shaft hole 17 and the second shaft hole 18 respectively, functioning as bearings interposed between the roller 11 and the roller shaft 12 to allow smooth rotation of the roller 11. The bushings 13 are so-called collared bushings and each of the bushings 13 has a cylindrical portion 27 and a collar portion 28. The cylindrical portions 27 of the bushings 13 are press-fit in the shaft holes 17, 18 respectively of the roller 11. Each collar portion 28 extends in a radial direction from one end of its associated cylindrical portion 27 and hits against an innermost surface 25a of its associated third stepped portion 25 of the roller 11 (see FIG. 3).

(Outline of Collar) The collars 15 are mounted to the ends, respectively, of the roller shaft 12 by press fitting. Each collar 15 is formed such that a flange portion 15b and a mounting portion 15c (see FIG. 1(b)) are respectively formed integrally with a collar body 15a having a shaft hole 61 through which the roller shaft 12 passes.

(Outline of Structure of Seal)

The seal 14 is embedded in an annular space 26 defined at each end of the roller 11. This seal 14 is composed of an inner circumference side sealing portion 30a provided on its inner circumference side and an outer circumference side sealing portion 30b provided on its outer circumference side, the inner circumference side sealing portion 30a having an annular shape and a shaft hole 29 of specified inner diameter whereas the outer circumference side sealing portion 30b is so disposed as to enclose the inner circumference side sealing portion 30a. These sealing portions 30a, 30b are assembled such that they can be in slidable contact with each other.

(Outline of Structure of Inner Circumference Side Sealing Portion)

Figure 3:
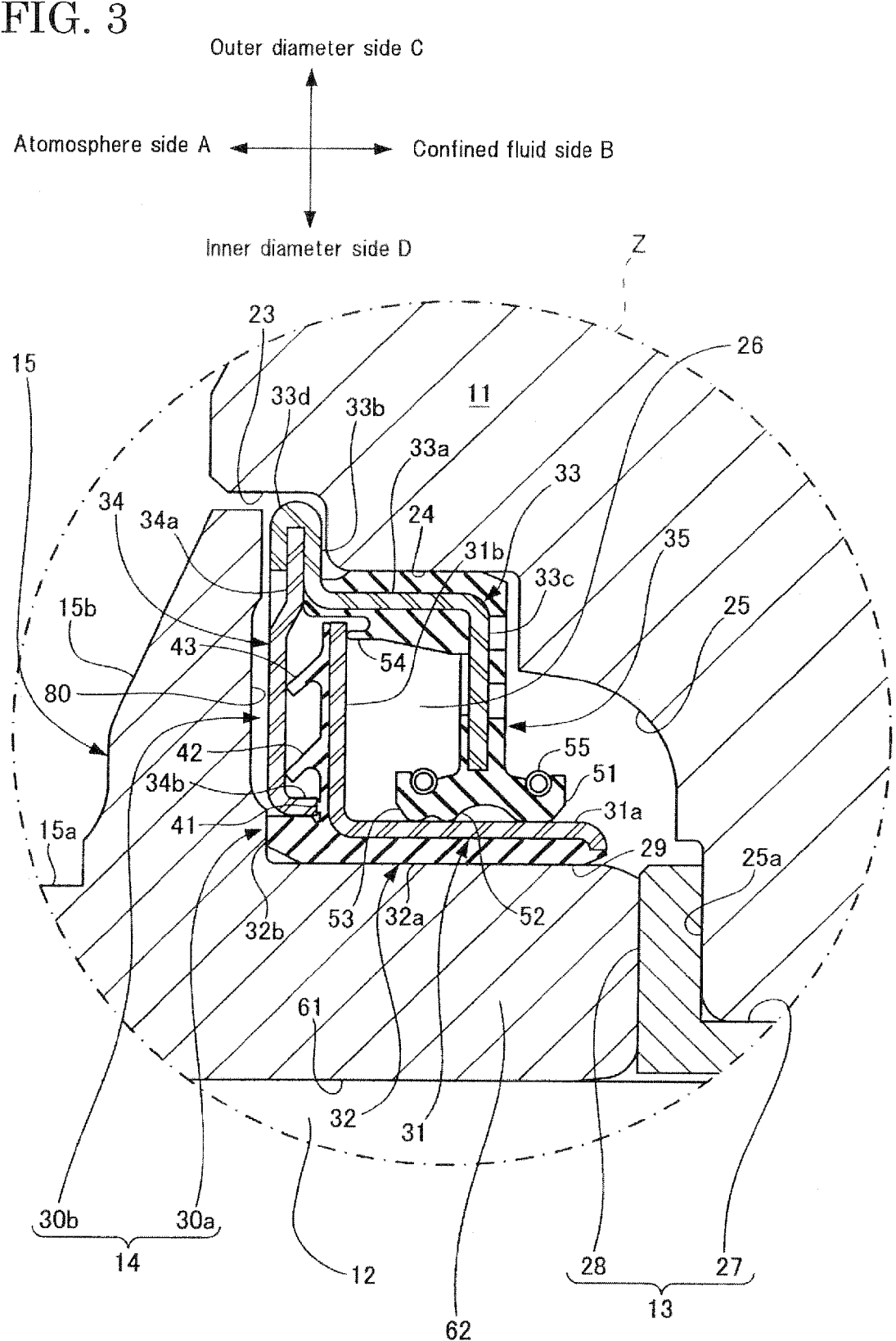
FIG. 3 is an enlarged view of a Z part shown in FIG. 2.
Figure 4:
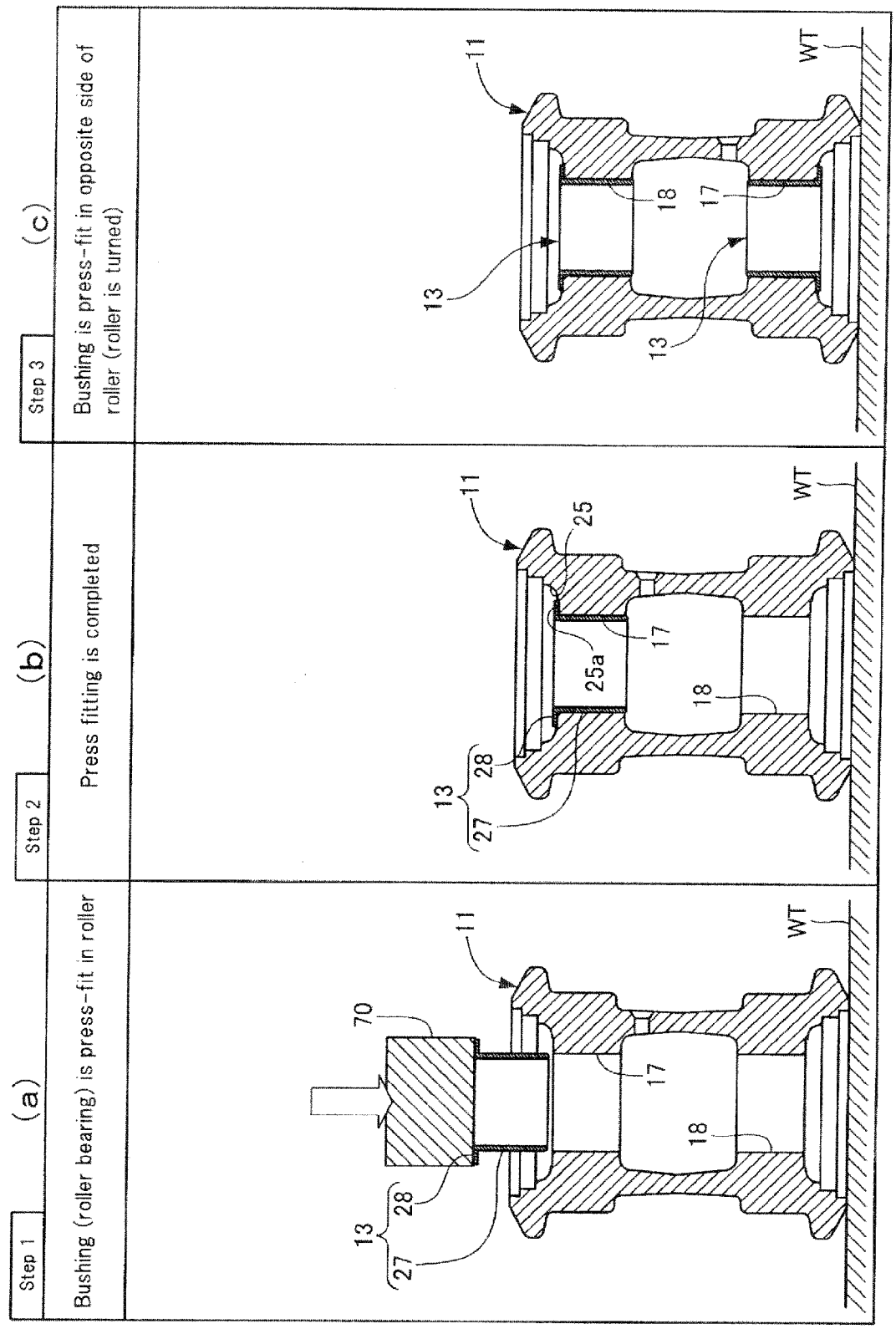
FIG. 4 is an explanatory assembly diagram (1) of a track roller unit.
Figure 5:
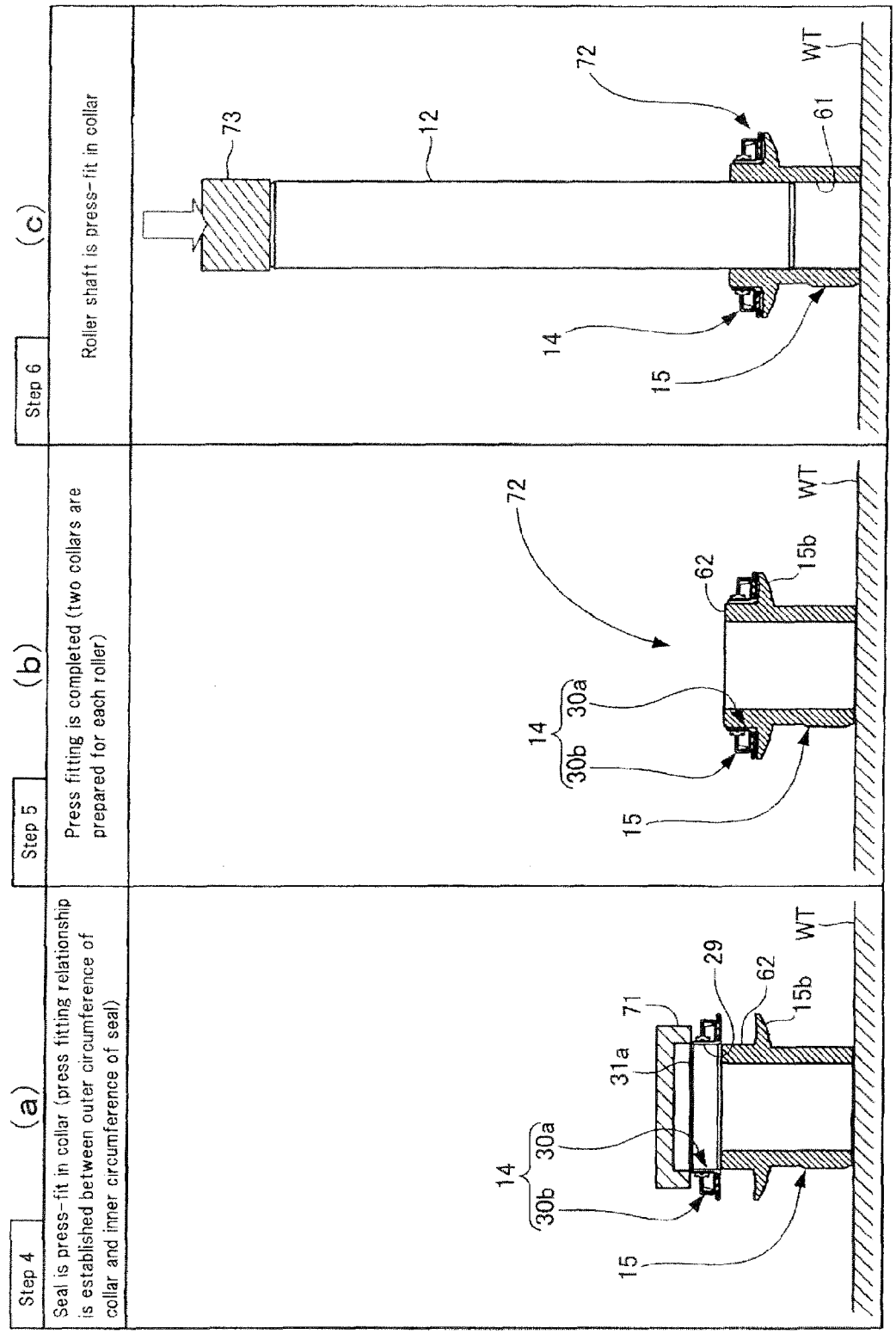
FIG. 5 is an explanatory assembly diagram (2) of the track roller unit.
Figure 6:
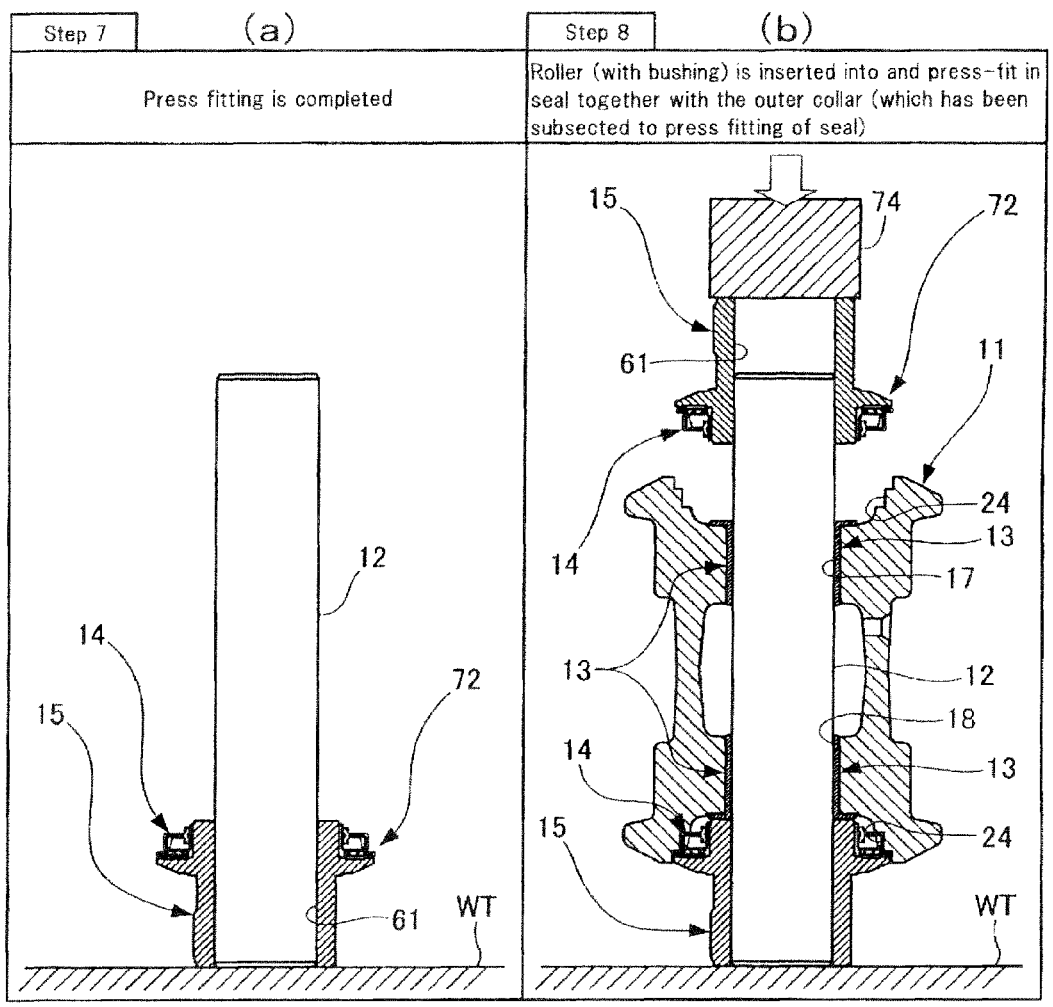
FIG. 6 is an explanatory assembly diagram (3) of the track roller unit.
Figure 7:
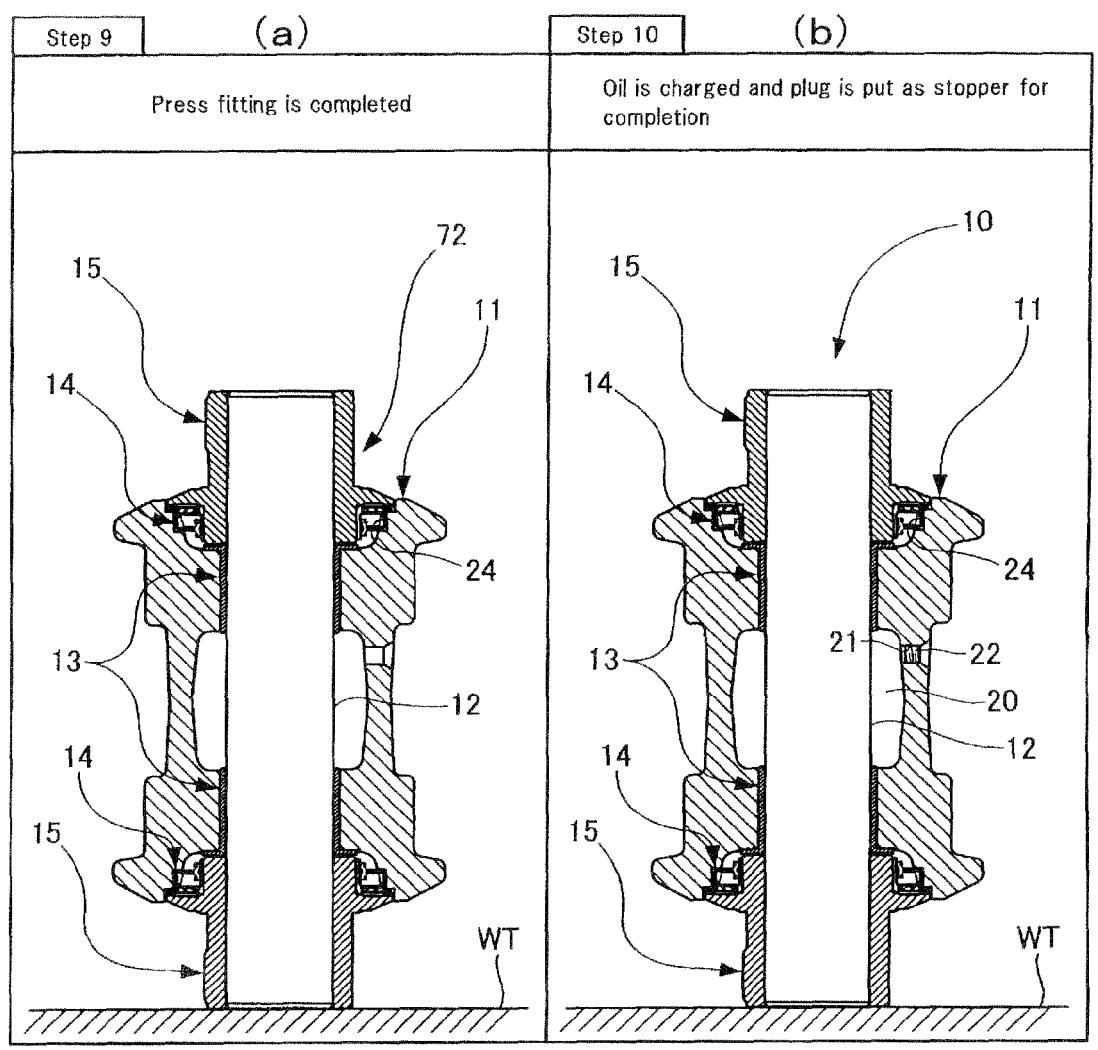
FIG. 7 is an explanatory assembly diagram (4) of the track roller unit.

As shown in FIG. 3, the inner circumference side sealing portion 30a has an inner circumference side frame ring 31 and an inner circumference side seal body 32.

(Description of Inner Circumference Side Frame Ring)

The inner circumference side frame ring 31 has a cylindrical portion 31a extending in an axial direction of the roller shaft 12 and a flange portion 31b extending from the end (located on an atmosphere side A) of the cylindrical portion 31a toward an outer diameter side C.

(Description of Inner Circumference Side Seal Body)

The inner circumference side seal body 32 is made of a rubber-like elastic body and adhered to an area that extends from the inner circumferential surface of the cylindrical portion 31a of the inner circumference side frame ring 31 to the end face (located on the atmosphere side A) of the flange portion 31b.

(Outline of Structure of Outer Circumference Side Sealing Portion)

The outer circumference side sealing portion 30b has an outer circumference side frame ring 33, a protection ring 34 and an outer circumference side seal body 35.

(Description of Outer Circumference Side Frame Ring)

The outer circumference side frame ring 33 has a cylindrical portion 33a extending in an axial direction of the roller shaft 12, an outward-facing flange portion 33b extending from the end (located on the atmosphere side A) of the cylindrical portion 33a toward the outer diameter side C; and an inward-facing flange portion 33c extending from the end (located on a confined fluid side B) of the cylindrical portion 33a toward an inner diameter side D.

(Description of Protection Ring)

The protection ring 34 has a flange portion 34a that is opposed to and spaced from the flange portion 31b of the inner circumference side frame ring 31 with a specified spacing in a direction toward the atmosphere side A; and a cylindrical portion 34b that extends from the inner circumferential portion of the flange portion 34a toward the confined fluid side B in an axial direction of the roller shaft 12.

The outer circumferential portion of the flange portion 34a of the protection ring 34 is in contact with the end face (located on the atmosphere side A) of the outward-facing flange portion 33b of the outer circumference side frame ring 33 and is securely fastened by a fastening portion 33d that is folded in a direction from the outer circumferential portion of the outward-facing flange portion 33b toward the inner diameter side D. In this way, the outer circumference side frame ring 33 and the protection ring 34 are integrally combined.

(Description of Outer Circumference Side Seal Body)

The outer circumference side seal body 35 is made of a rubber-like elastic body and adhered to an area that extends from the outer circumferential surface of the cylindrical portion 33a of the outer circumference side frame ring 33 to the end face (located on the atmosphere side A) of the inward-facing flange portion 33c through the end face (located on the confined fluid side B) of the inward-facing flange portion 33c.

(Description of Lip of Inner Circumference Side Seal Body)

The inner circumference side seal body 32 has a first lip 41, a second lip 42 and a third lip 43.

The first lip 41 projects in a direction toward the atmosphere side A, being in slidable contact with an end face of the cylindrical portion 34b of the protection ring 34.

The second lip 42 inclines toward the atmosphere side A as it extends in a direction toward the inner diameter side D. The second lip 42 is in slidable contact with the end face (located on the confined fluid side B) of the flange portion 34a of the protection ring 34.

The third lip 43 is a specified distance away from the second lip 42 in a direction toward the outer diameter side C and inclines to the atmosphere side A as it extends in a direction toward the inner diameter side D. The third lip 43 is in slidable contact with the end face (located on the confined fluid side B) of the flange portion 34a of the protection ring 34.

(Description of Lips of Outer Circumference Side Seal Body)

The outer circumference side seal body 35 has a first lip 51, a second lip 52, a third lip 53 and a fourth lip 54.

The first lip 51 extends toward the confined fluid side B, being in slidable contact with the outer circumferential surface of the cylindrical portion 31a of the inner circumference side frame ring 31. Mounted on the outer circumference side of the first lip 51 is a garter spring 55 that imparts a clamp force in a direction toward the inner diameter side D.

The second lip 52 extends toward the atmosphere side A, being in slidable contact with the outer circumferential surface of the cylindrical portion 31a of the inner circumference side frame ring 31.

The third lip 53 extends further from the second lip 52 to the atmosphere side A and is, similarly, in slidable contact with the outer circumferential surface of the cylindrical portion 31a of the inner circumference side frame ring 31.

The fourth lip 54 extends from the end face (located on the atmosphere side A) of the inward-facing flange portion 33c of the outer circumference side frame ring 33 toward the atmosphere side A, being in slidable contact with the end face (located on the confined fluid side B) of the cylindrical portion 31b of the inner circumference side frame ring 31.

(Description of Boss Portion)

The collar body 15a has a cylindrical boss portion 62 that projects into the annular space 26. The seal 14 is pressed into the boss portion 62 through the shaft hole 29 of the inner circumference side sealing portion 30a. An end face of the boss portion 62 abuts on the collar portion 28 of the bushing 13 such that the end face of the boss portion 62 receives a thrust load from the roller 11. The adoption of the configuration in which the thrust load of the roller 11 is received by the end face of the boss portion 62 eliminates the need to provide the inside of the track roller unit 10 with a particular mechanism for receiving the thrust load of the roller 11, so that the inner structure of the track roller unit 10 can be simplified.

(Description of Flange Portion of Collar)

The flange portion 15b of the collar 15 has such a size that it can be accommodated within the first stepped portion 23 of the roller 11, which portion 15b circumferentially protrudes from the collar body 15a toward the outer diameter side C. In this embodiment, the end face (located on the confined fluid side B) of the flange portion 15b is provided with an annular shallow groove 80 that is concentrically formed at the substantial center of an annular flat portion.

The flange portion 15b is in contact with the end face (located on the atmosphere side A) of the inner circumference side sealing portion 30a among the outer end faces of the seal 14 press-fit in the boss portion 62. The other end face, that is, the end (located on the atmosphere side A) of the outer circumference side sealing portion 30b is opposed to the flange portion 15b with a specified spacing. The groove 80 is formed in this opposite area of the flange portion 15a. This flange portion 15b can entirely cover the seal 14 from the outside so as to shut it from the outside and can close the opening defined by the first stepped portion 23 of the roller 11.

(Description of Mounting Portion of Collar)

As shown in FIG. 1(b), the mounting portion 15c of the collar 15 protrudes in block form from the collar body 15a in a longitudinal direction of the track frame 4 and has a mounting surface 63 that comes into contact with the underside of the track frame 4 and has a desired bolt insertion hole 64. The mounting portion 15c is secured to the track frame 4 by clamping with a bolt 65 that screws into the track frame 4 through the bolt insertion hole 64. By adopting such a configuration of the mounting portion 15c integrally formed with the collar body 15a, the mounting structure of the track roller unit 10 can be simplified.

Reference is made to FIGS. 4 to 7 to describe the assembling process of the track roller unit 10.

(See FIG. 4(a): Description of Step 1)

The roller 11 is placed on a work table WT with its first shaft hole 17 facing up. Subsequently, an abutment jig 70 is placed on the collar portion 28 of the bushing 13 with the tip of the cylindrical portion 27 of the bushing 13 being fit to the entrance portion of the first shaft hole 17 of the roller 11 and, then, the abutment jig 70 is pressed by a press machine (not shown) or similar means.

(See FIG. 4(b): Description of Step 2)

The press-in force of the press machine or the like is applied to the bushing 13 through the abutment jig 70 (see FIG. 4(a)) and the busing 13 is forcibly inserted into the first shaft hole 17 until the collar portion 28 of the bushing 13 hits against the innermost surface 25a of the third stepped portion 25.

(See FIG. 4(c): Description of Step 3)

The roller 11 is turned upside down and placed on the work table WT with its second shaft hole 18 facing up. Similarly to Steps 1 and 2, the bushing 13 is pressed into the second shaft hole 18.

(See FIG. 5(a): Description of Step 4)

The collar 15 is placed on the work table WT with its boss portion 62 facing up.

Subsequently, the outer end faces of the seal 14 are positioned in relation to the flange portion 15b of the collar 15. Subsequently, an abutment jig 71 is placed on the cylindrical portion 31a of the inner circumference side frame ring 31 with the entrance portion of the shaft hole 29 of the inner circumference side sealing portion 30a being fit to the tip of the boss portion 62 of the collar 15 and, then, the abutment jig 71 is pressed by a press machine (not shown) or similar means.

(See FIG. 5(b): Description of Step 5)

The seal 14 is pressed into the boss portion 62 of the collar 15 by applying the press-in force of the press machine or the like to the seal 14 through the abutment jig 71 (see FIG. 5(a)), until the outer end faces of the seal 14, that is, the outer end face of the inner circumference side sealing portion 30a and the outer end face of the outer circumference side sealing portion 30b both hit against the flange portion 15b of the collar 15.

It should be noted that two members (this member is hereinafter referred to as "seal embedded collar 72"), in each of which the seal 14 is pressed into the boss portion 62 of the collar 15, are prepared for each roller.

(See FIG. 5(c): Description of Step 6)

The roller shaft 12 is arranged such that its first end faces up and its second end is fit to the entrance portion of the shaft hole 61 of the collar 15. Then, an abutment jig 73 is placed on the first end face of the roller shaft 12 and pressed by a press machine (not shown) or similar means.

(See FIG. 6(a): Description of Step 7)

Subsequently, the second end of the roller shaft 12 is pressed into the shaft hole 61 of the collar 15 by applying the press-in force of the press machine or the like to the roller shaft 12 through the abutment jig 73 (see FIG. 5(c)), until the second end face of the roller shaft 12 hits against the work table.

(See FIG. 6(b): Description of Step 8)

In the roller 11, the roller shaft 12 is inserted into the bushing 13 press-fit in the second shaft hole 18 and is then inserted into the bushing 13 press-fit in the first shaft hole 17, whereby the roller 11 is fit in the roller shaft 12. This establishes such a condition that the seal 14 can be pressed into the second stepped portion 24 located at the second end of the roller 11.

Then, the entrance portion of the shaft hole 61 of the collar 15 of another prepared seal embedded collar 72 is fit to the first end of the roller shaft 12 and an abutment jig 75 is placed on the collar 15. In this condition, the abutment jig 75 is pressed by a press machine (not shown) or similar means.

In this way, the collar 15 is pressed into the roller shaft 12 and at the same time, the roller 11 is pressed into the roller shaft as described later. Then, the seal 14 is pressed into the roller 11 by applying the press-in force of the press machine or the like to the roller 11 through an abutment jig 74 until the collar portion 28 of the bushing 13 press-fit in the second shaft hole 18 hits against the end face of the boss portion 62 of the collar 15, that is, until the gap between the bushing 13 and the collar 15 becomes zero.

(See FIG. 7(a): Description of Step 9)

The seal embedded collars 72 is pressed into the first end of the roller shaft 12 by applying the press-in force of the press machine or the like to the seal embedded collar 72 through the abutment jig 74 (see FIG. 6(b)) until the abutment jig 74 hits against the first end of the roller shaft 72. This causes the seal 14 to be pressed into the second stepped portion 24 located at the first end of the roller 11.

(See FIG. 7(b): Description of Step 10)

After injecting lubricant oil into the oil reservoir 20 through the oil feeding screw hole 21 of the roller 11, the plug screw 22 is screwed into the oil feeding screw hole 21 to close it and thus, the assembly of the track roller unit 10 is completed.

(Description of Operational Effect of Track Roller Unit of Invention)

In the track roller unit 10 of this embodiment, the flange portion 15b of the collar 15 is brought into contact with the outer end face of the seal 14 press-fit in the boss portion 62 of the collar 15, that is, the end face (located on the atmosphere side A) of the inner circumference side sealing portion 30a. This enables it to prevent penetration of earth, sand, etc. into the seal slidable contact parts of the inner circumference side sealing portion 30a and the outer circumference side sealing portion 30b by the flange portion 15b of the collar 15. Therefore, the wear of the seal 14 attributable to the penetration of earth, sand etc. into the seal slidable contact parts can be restricted and this leads to an increase in the service life of the seal 14.

In Steps 8 to 10 (see FIGS. 6(b), 6(c) to FIG. 7(a)), when pressing the seal 14 into the second stepped portion 24 of the roller 11, the end face (located on the atmosphere side A) of the inner circumference side sealing portion 30a is pressed by the flange portion 15b of the collar 15. This enables it to uniformly apply press-in force to the entire outer end face of the seal 14 from the flange portion 15b of the collar 15. Accordingly, the seal 14 can be smoothly pressed into the second stepped portion 24 of the roller 11 without use of special tools or the like so that the ease of unit assemblability can be improved.

When inserting the seal 14 into the annular space 26 between the roller 11 and the roller shaft 12, only the end face of the inner circumference side sealing portion 30a of the seal 14 is pressed by the flange portion 15b of the collar 15. Therefore, no load is imposed on the outer circumference side sealing portion 30b so that a proper positional relationship can be maintained between the outer circumference side sealing portion 30b and the inner circumference side sealing portion 30a. Accordingly, the gap between the outer circumference side sealing portion 30b and the inner circumference side sealing portion 30a is properly sealed.

Since the flange portion 15b of the collar 15 is provided with the circumferential groove 80 located on the side in contact with the outer end face of the seal 14, the rotating side (i.e., the outer circumference side sealing portion 30b) among the outer end faces of the seal 14 can be prevented from hitting against the flange portion 15b of the collar 15 during the process of assembling so that deformation of and damage to the seal 14 can be avoided (the same effect can be expected during traveling).

Although the roller unit of the invention has been described according to one embodiment of the invention, the invention is not necessarily limited to the particular configuration discussed in the embodiment shown herein and various changes and modifications are made to the configuration without departing from the spirit and scope of the invention.

INDUSTRIAL APPLICABILITY

Since the roller unit of the invention is characterized in that not only the service life of the seal can be extended but also the ease of unit assemblability can be improved, it can be well suited for use as a track roller or track carrier roller provided in the crawler track units of a work vehicle such as hydraulic excavators and bulldozers.

REFERENCE NUMERALS

1: crawler track unit
4: track frame
8: crawler belt
10: track roller unit
11: roller
12: roller shaft
14: seal
15: collar
15b: flange portion
15c: mounting portion
26: annular space
30a: inner circumference side sealing portion
30b: outer circumference side sealing portion
62: boss portion
80: groove

The invention claimed is:

1. A roller unit comprising:
a roller configured to roll in contact with a crawler belt;
a roller shaft for rotatably supporting said roller;
a seal fit in an annular space defined between said roller and said roller shaft, wherein said seal is formed such that an inner circumference side sealing portion located on an inner circumference side and an outer circumference side sealing portion located on an outer circumference side and press-fit in said roller are fit together so as to come into slidable contact with each other;
a collar mounted to said roller shaft, wherein said collar has a boss portion onto which said inner circumference side sealing portion is pressed and a flange portion disposed on an atmosphere side of said inner circumference side sealing portion;
wherein a gap is formed between an end face of said outer circumference side sealing portion and said flange portion and said flange portion is provided with a circumferentially extending groove formed on a side opposed to said outer circumference side sealing portion; and
wherein said outer circumference side sealing portion is disposed so as to enclose said inner circumference side sealing portion, and said flange portion is brought into contact with an end face of said inner circumference side sealing portion located on the atmosphere side of said inner circumference side sealing portion.

2. The roller unit according to claim 1, wherein said collar has a mounting portion integrally formed therewith, said mounting portion being secured to a track frame that serves as a mating part when said roller unit is mounted.

3. The roller unit according to claim 1, wherein a thrust load from said roller is received by an end face of said boss portion.

4. The roller unit according to claim 2, wherein a thrust load from said roller is received by an end face of said boss portion.

* * * * *